US009047374B2

(12) United States Patent
Johnson et al.

(10) Patent No.: US 9,047,374 B2
(45) Date of Patent: Jun. 2, 2015

(54) ASSEMBLING VIDEO CONTENT

(75) Inventors: Gary Johnson, San Jose, CA (US); Mike Marinkovich, Santa Clara, CA (US); Greg Lindley, Sunnyvale, CA (US); Alan Cannistraro, San Francisco, CA (US); Evan Doll, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 2326 days.

(21) Appl. No.: 11/760,691

(22) Filed: Jun. 8, 2007

(65) Prior Publication Data

US 2008/0304807 A1   Dec. 11, 2008

(51) Int. Cl.
G06F 17/00 (2006.01)
G06F 17/30 (2006.01)
H04N 21/854 (2011.01)

(52) U.S. Cl.
CPC ........ *G06F 17/30787* (2013.01); *H04N 21/854* (2013.01); *G06F 17/30793* (2013.01); *G06F 17/3079* (2013.01); *G06F 17/30781* (2013.01); *G06F 17/30796* (2013.01); *G06F 17/30817* (2013.01); *G06F 17/30843* (2013.01)

(58) Field of Classification Search
CPC ................ G06F 17/30781; G06F 17/30817; G06F 17/3079; G06F 17/30793; H04N 21/854
USPC ........... 382/107; 345/473; 715/719; 386/278
See application file for complete search history.

(56) References Cited

U.S. PATENT DOCUMENTS

| 5,708,767 | A * | 1/1998 | Yeo et al. ...................... 345/440 |
| 6,038,368 | A * | 3/2000 | Boetje et al. .................. 386/278 |
| 6,665,423 | B1 * | 12/2003 | Mehrotra et al. ............. 382/107 |
| 6,741,655 | B1 * | 5/2004 | Chang et al. ............. 375/240.26 |
| 6,901,110 | B1 * | 5/2005 | Tsougarakis et al. ..... 375/240.12 |
| 7,035,435 | B2 * | 4/2006 | Li et al. .......................... 382/107 |
| 7,199,798 | B1 * | 4/2007 | Echigo et al. ................. 345/473 |
| 7,310,589 | B2 * | 12/2007 | Li ................................... 702/179 |
| 7,421,391 | B1 * | 9/2008 | Merkel ......................... 704/270 |
| 7,509,580 | B2 * | 3/2009 | Sezan et al. ................... 715/719 |
| 7,653,131 | B2 * | 1/2010 | Pan et al. ................. 375/240.08 |
| 7,804,506 | B2 * | 9/2010 | Bates et al. ................... 345/589 |

(Continued)

FOREIGN PATENT DOCUMENTS

WO    WO 02/23891    3/2002

OTHER PUBLICATIONS

CyberLink, CyberLink PowerDirector 5 User's Guide, Dec. 2005, CyberLink Corp.*

(Continued)

*Primary Examiner* — Adam M Queler
(74) *Attorney, Agent, or Firm* — Schwegman Lundberg & Woessner, P.A.

(57) ABSTRACT

A computer-implemented method involves accessing a library of video segments, receiving a user instruction to assemble a movie related to an organizing element that includes a video segment from the library of video segments, relating the organizing element to a video segment in the library of video segments, determining, based on relating the organizing element to the video segment in the library of video segments, whether the video segment should be added to a list of selected segments used to assemble the movie, selectively adding the video segment to the list of selected segments in response to determining that the video segment should be added, and assembling the movie using the list of selected segments.

18 Claims, 14 Drawing Sheets

(56) References Cited

U.S. PATENT DOCUMENTS

| | | | |
|---|---|---|---|
| 7,904,814 B2* | 3/2011 | Errico et al. | 715/725 |
| 7,983,442 B2* | 7/2011 | Chiang et al. | 382/100 |
| 2002/0112180 A1* | 8/2002 | Land et al. | 713/200 |
| 2004/0167767 A1* | 8/2004 | Xiong et al. | 704/1 |
| 2007/0244902 A1* | 10/2007 | Seide et al. | 707/10 |
| 2007/0248327 A1* | 10/2007 | Chen | 386/96 |
| 2007/0250777 A1* | 10/2007 | Chen et al. | 715/723 |
| 2008/0019665 A1* | 1/2008 | Huang et al. | 386/95 |

OTHER PUBLICATIONS

International Search Report and Written Opinion of corresponding International Application No. PCT/US2008/065923, mailed Oct. 8, 2008.

"MPEG-VCR Video Editor: User's Guide," Womble Multimedia, Inc., Cupertino, CA, reprinted from http://www.womble.com/exe/guide.pdf on Apr. 29, 2004, 41 pages.

* cited by examiner

ASSEMBLING VIDEO CONTENT

TECHNICAL FIELD

This document relates to assembling content, for example, digital image content such as video clips.

BACKGROUND

The growth of consumer electronics has enabled a large population to engage in production of rich media content, such as video productions. Across the large population, varying degrees of skill sets exist to produce rich media productions (e.g., movies). Novices may experience difficulty in performing elementary operations and more "advanced" users may struggle to perform desired operations in an efficient manner.

SUMMARY

In one general sense, a movie is assembled by accessing a library of video segments. A user instruction is received to assemble a movie related to an organizing element that includes a video segment from the library of video segments. The organizing element is related to a video segment in the library of video segments. Based on relating the organizing element to the video segment in the library of video segments, it is determined whether the video segment should be added to a list of selected segments used to assemble the movie. The video segment is selectively added to the list of selected segments based on a result of the determination, for example, in response to determining that the video segment should be added. The movie is assembled using the list of selected segments.

Implementations may include one or more of the following features. For example, receiving the user instruction to assemble a movie related to an organizing element may include receiving, from a user, an event description describing an activity which the user is interested in adding to the list of selected segments. The event description is used as the organizing element.

The user may be prompted to identify an example of the activity. The user then is enabled to navigate in the library of video segments to launch one of the video segments and designate visual elements, within the launched video segments, that indicate that the activity is occurring. The visual elements are used to identify that the activity is occurring in other video segments in the library of video segments.

Enabling the user to designate visual elements may include analyzing the spatial imagery within a launched video segment, identifying one or more objects in the launched video segment, graphically designating the one or more objects in the launched video segment, enabling the user to select one or more of the graphically-designated objects, and using the selected objects as the visual elements that identify the activity is occurring in the other video segments in the library of video segments.

The user may be presented with a list of activities associated with default elements for each of the activities, the default elements related to previously-defined visual elements that are descriptive of the activity and enabled to select one of the activities. The default elements for the selected activity are used to identify that the activity is occurring in other video segments in the library of video segments.

A video segment from the library of video segments may be launched. Instances of the default elements appearing in the video segment are identified. The user is prompted to confirm that the identified instances are responsive to the user's interests and content related to the identified instances is added to the list of selected segments.

Receiving the user instruction to assemble a movie related to an organizing element may include receiving, from a user, a person description describing an individual for which the user is interested in adding to the list of selected movies. The person description then is used as the organizing element.

The user may be prompted to identify an example of the individual and enabled to navigate in the library of video segments to launch one of the video segments. The user then is enabled to designate visual elements, within the launched video segments, that indicate that the individual is appearing. The visual elements are then used to identify that the individual is appearing in other video segments in the library of video segments. Receiving the user instruction to assemble a movie related to an organizing element may include receiving, from a user, an exclamatory description entered as text describing audio content that is based on the text for which the user is interested in adding to the list of selected movies, and using the exclamatory description as the organizing element.

Receiving the user instruction to assemble a movie related to an organizing element may include receiving, from a user, an individual audio profile describing an individual whom the user is interested in adding to the list of selected movies, and using the individual audio profile as the organizing element.

The user may be prompted to identify an example of the individual speaking and enabled to navigate in the library of video segments to launch one of the video segments. The user is enabled to indicate audio designators for portions of time, within the launched video segments, that indicate that when individual is speaking. The audio designators are used to identify other instances of content when the individual is speaking in other video segments in the library of video segments. The list of selected segments is presented to a user before assembling the movie, and the user is enabled to further specify which of the selected segments from the list of selected segments should be used to assemble the movie.

The user may be enabled to designate two different types of organizing elements selected from the group that includes event descriptions, visual elements, exclamatory descriptions, and individual audio profiles. Before assembling the movie, the list of selected segments is presented. For each of the selected segments in the list of video segments, an indication of which of the different types of organizing element is related to the video segment is presented. The user is enabled to further specify which of the selected segments from the list of selected segments should be used to assemble the movie. Adding the video segment to the list of selected segments may include adding an excerpt from a larger portion of video content, the excerpt related to the organizing element. Adding the excerpt may include adding introductory content occurring in advance of desired content, and adding trailing content that follows the desired content, wherein the introductory content and the trailing content are not required to be responsive to the organizing element.

Those portions of content from the video segment that are not related to the organizing element may not be added.

A first instance and second instance of content in a video segment related to the organizing element may be identified. The first and second instances of content are added to the list of selected segments as separate and distinct video segments.

DETAILED DESCRIPTION

Figure 1:
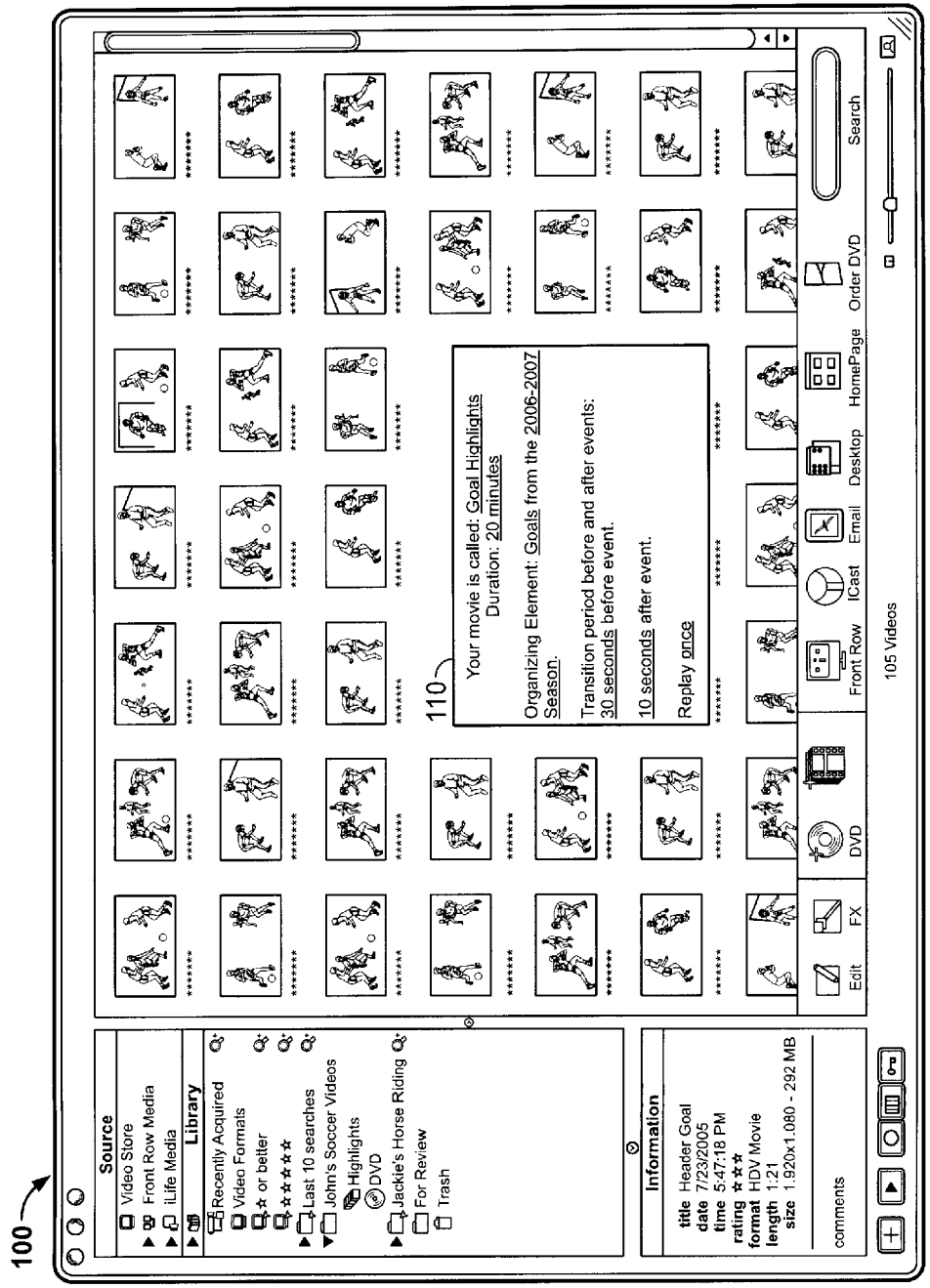
FIG. 1 is a GUI (Graphical User Interface) of a high-level control for an application that assembles movies using two or more video segments.

The ever increasing availability of camcorders and other video capture devices enables consumers to easily generate vast libraries of video content. Coaches and parents are using digital camcorders and camera phones to record their child's sporting events. A parent may easily generate hours of content from a season or even a few games. And, video footage of a particular game even may include scores of "clips" or "takes."

Computers can make this content even more valuable. For example, Apple Inc.'s iLife™ suite enables movies to be created and "released" in a variety of packages. Specifically, iMovie™ (and other video editing products) can be used to generate and edit a movie by performing nonlinear video editing tasks, such as creating titles, overlays, and transitions. iDVD™ can be used create a DVD with movies that the user has created.

Even with the array of sophisticated tools that enable both amateur and advanced users to create visually stunning productions, a number of factors challenge both amateur and advanced users. First, video libraries can be cumbersome. There is simply too much video footage available, particularly where a user only has a limited amount of time to enjoy watching the footage. In other instances, it is unclear which footage will later become of interest. This is particularly the case where an audience would be interested in only a small excerpt from a larger portion of content (e.g., the single goal scored in a youth soccer game). Thus, users can struggle with finding the "right" (e.g., exciting or otherwise visually pleasing) content, even where the library is quite small. As a result, a user producing content for others may spend a tremendous amount of time finding the "right" content. Alternatively, if a "producer" (e.g., a user editing video clips to produce a movie) is not selective in selecting video content, a "consumer" may be forced to watch an large amounts of irrelevant content before reaching relevant content.

Second, a user producing content may have only a limited amount of time to generate movies. For example, a soccer coach producing a DVD with season highlights for his players may wish to spend only an hour or so to produce highlights that will be distributed. If too much time is required in order for a user to produce a movie, the user may simply choose not to produce any movies, or reduce the number of movies that are produced. In the case of the soccer coach producing the season highlights, the inability to find and assemble the "right" content may lead to relevant content being lost (or not included), and undesired content being included.

Thus, a video assembly application may be used to assemble movies for a user using an organizing element that identifies relevant content. In particular, a computer assembling the movie accesses a library of video segments. For example, the video assembly application may load a library of video segments that have been downloaded from a user's digital camcorder. The video assembly application receives a user instruction to assemble a movie related to an organizing element that includes a video segment from the library of video segments. For example, a soccer coach making a movie with season highlights may specify that video highlights with goals should be identified and collected for use in the movie. The video assembly application relates the organizing element to a video segment in the library of video segments. In the soccer highlights example, the video assembly application analyzes video segments within the library of video segments to identify which portions of a video segment, if any, include footage of a goal. Based on relating the organizing element to the video segment in the library of video segments, the video assembly application determines whether the video segment should be added to a list of selected segments used to assemble the movie. If the video segment relates to the organizing element, the video segment is added to the list of selected segments and the movie is assembled using the list of selected segments.

Although the example above dealt with an amateur soccer coach, advanced users also may rely on these operations to realize their goals. For example, an assistant video editor in a news organization managing a large library may use a video assembly application that performs the same operations in generating a sequence of video segments that are responsive to the executive producer's interests. The assistant video editor generates a short movie with the relevant segments for the executive producer to review. Thus, the short movie enables the executive producer to quickly understand the availability of relevant content.

FIG. 1 is a GUI 100 of a high-level control for an application that assembles movies using two or more video segments. In particular, prompt 110 indicates that the user is generating a 20 minute highlight clip with goals from the 2006-2007 season. As shown, a number of elements appearing in prompt 110 are underlined, indicating that the element is active. An active element indicates that the user may interact with the underlined element to retrieve additional information and/or change the parameters associated with the underlined element. As shown, the active elements are the movie name, "Goal Highlights", the duration (20 minutes), and the organizing element (Goals from the 2006-2007 season). The transition period is 30 seconds before an event and 10 seconds after an event. A goal is replayed once. The user may interact with the "2006-2007 season" label to modify the pool of video segments being analyzed for inclusion. Each of the video segments may be associated with one or more time stamps based on the date in which the video was captured, and downloaded to the library.

An organizing element is a factor, element, or goal around which relevant video content is identified. In some instances, the organizing element is a label representing one or more underlying parameters. As shown, the organizing element is referenced as "goals," presumably a collection of goals scored by a coach's team during a season. A "goal" may made up of one or more video, image, and/or audio selections.

The transition period determines the amount of proximate content around a relevant event that is included in the video segment (e.g., excerpt) that is added to the list of selected segments used to assemble the movie. It is often informative to a viewing user to perceive a degree of introductory and trailing content. Such introductory and trailing content leads to a viewing user being able to perceive an actual event in context, leading to greater enjoyment. For a goal that begins with an initiating kick and ends when the ball stops in the net, the duration of the event may be less than a second. However, the events leading to the goal likely included interesting subject matter, perhaps with intricate passing or a breakaway "stepover" move. Thus, to place the identified events in context and control the duration of the content being assembled, a user may vary the transition period.

The prompt 110 in GUI 100 is superimposed over a video library. The left side of the video assembly application is entitled "Source" and enables the user to specify which video content should be considered as the application is being loaded. Below "Source" is information about a particular video segment that has been selected by the user. The toolbar at the bottom of GUI 100 includes controls to launch one or more applications using a selected video segment. These applications include, among other things, (1) "Edit" to launch a nonlinear editor, (2) "Effects" to add special effects, (3) "DVD" to build a optical disk, (4) "Montage" to assemble a sequence of video segments, (5) "Front Row" to perceive content using Apple's Front Row software, and (6) "iCast" to include a video segment in a presentation shared with others.

Figure 2:
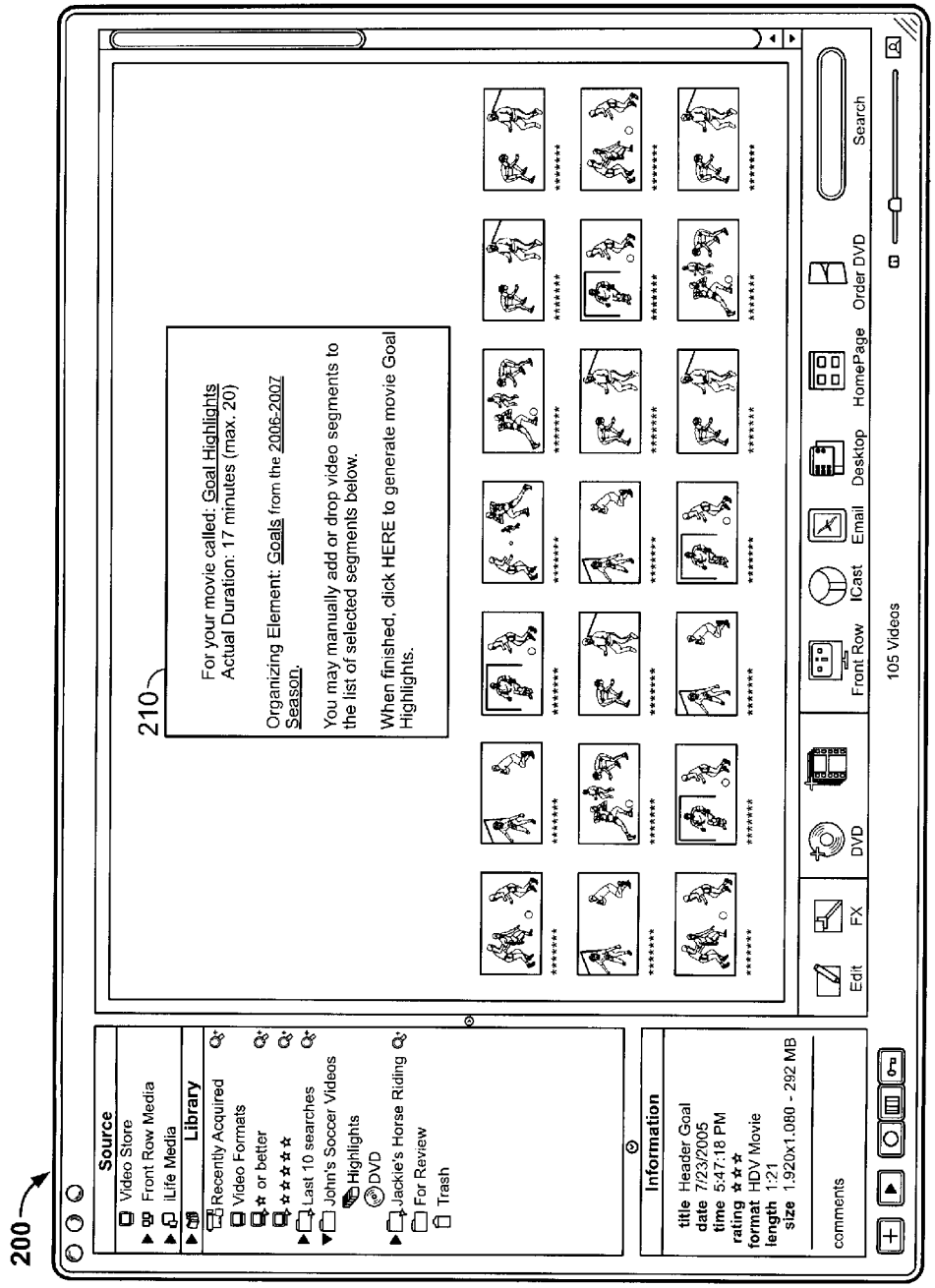
FIG. 2 is a GUI enabling a user to perceive which video segments will be used in a movie being assembled.

FIG. 2 is a GUI 200 enabling a user to perceive which video segments will be used in a movie being assembled. In particular, GUI 200 illustrates how video segments responsive to an organizing element are presented to the user. Whereas GUI 100 features a library that is larger than the 105 available video segments (as indicated in the bottom of the GUI), GUI 200 indicates that only the 21 shown video segments are responsive to the user's interest in "Goals" as a organizing element.

GUI 200 includes a prompt 210 with additional information about the proposed movie that has been assembled. Prompt 210 indicates that the video content responsive to the organizing element requires 17 minutes out of an available 20 minutes. Prompt 210 indicates that the user then may add and remove material from the list of selected segments shown below. For example, a user may launch a separate display from "sources," select a video to add, and then select "click HERE" to assemble the movie. In another implementation, the user may save an instance of the proposed movie, identify additional content, and then add the additional content to the saved movie.

Figure 3:
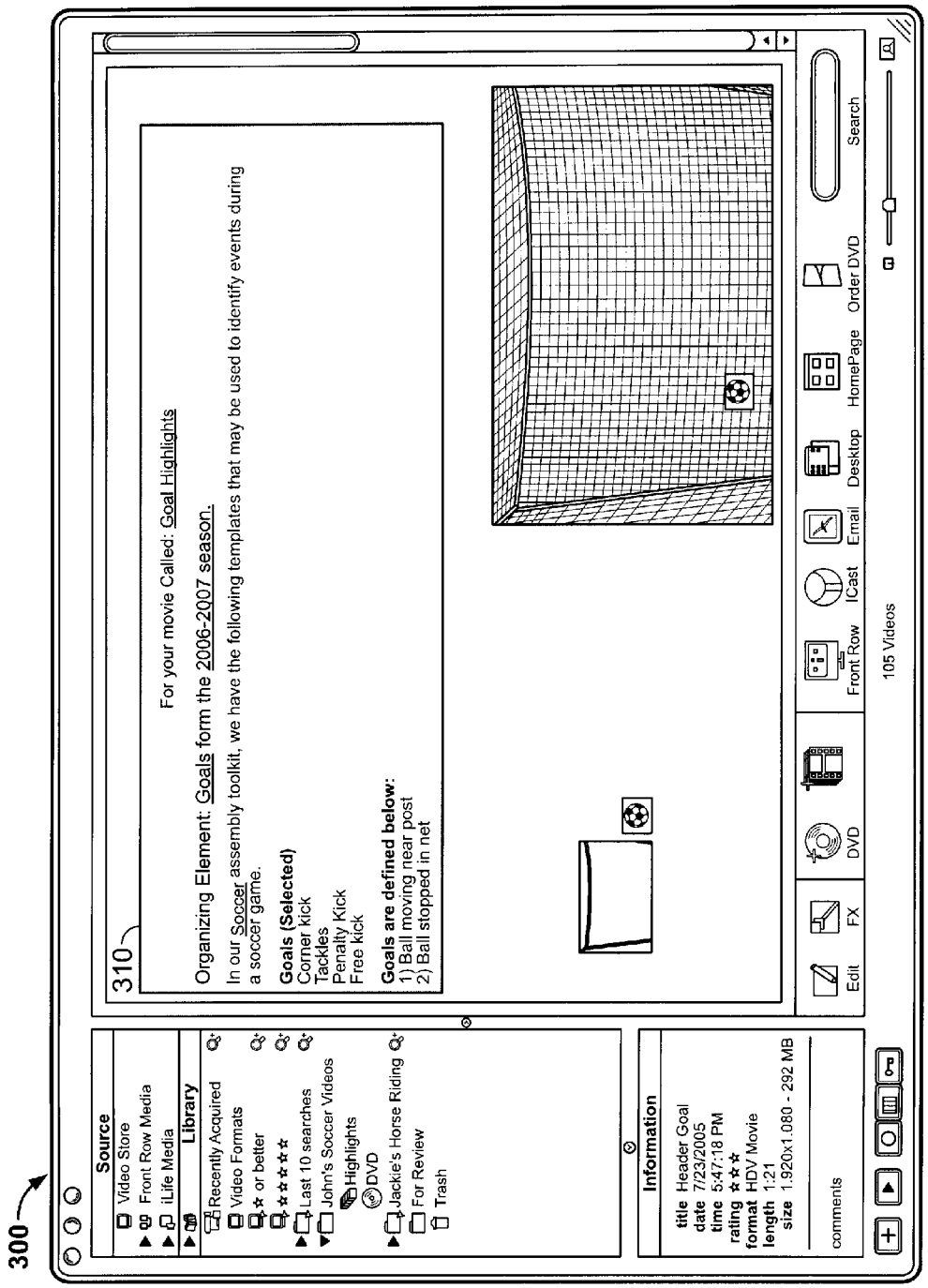
FIG. 3 is a GUI enabling a user to use default elements that identify activities in video segments that will be used in a movie being assembled.

FIG. 3 is a GUI 300 enabling a user to use default elements that identify activities in video segments that will be used in a movie being assembled. Recognizing that configuring a video assembly application to recognize a particular activity may be burdensome, or that some users may face challenges in configuring the video assembly application to identify the "right" content, the video assembly application may use one or more templates that are designed to recognize commonly sought content. In addition, the computational burden imposed on a video assembly action may be reduced by asking the user to identify a general type of activity that the user is inspecting (e.g., soccer). Within the general class of soccer activities, the computational burden of identifying more granular activities may be reduced by identifying actions relative to objects that are likely to appear in video segment (e.g., soccer balls, and goal posts). Events may therefore be identified by the video assembly application by defining a relationship between the different objects. As shown, the user is relying on a "Soccer" assembly toolkit with predefined templates configured to recognize several categories of events. In addition to the "Goals" template that has been selected, other templates available for selection include a "Corner kick" template, a "Tackles" template, a "Penalty Kick" template, and a "Free Kick" template.

The "Goals" template is defined by two actions that can be detected. First, the video assembly application may identify a goal by detecting a ball moving near a post. This is illustrated below in the left figure. Although a particular definition may incorrectly identify events, the burden of assembling a movie with the desired content still may be reduced. For example, although identifying soccer balls moving near nets also may identify shots that do not result in goals, such as those that are deflected, a user reviewing footage from a game is still only reviewing a small subset of the available content, and may easily delete entries from the list of selected results if a particular result does not result in a goal.

A "Goal" also is identified as a ball stopping in the net. As shown in the image to the lower right, the video assembly application is configured to identify those segments where a ball not moving appears against a backdrop of the mesh net that is installed across the structural frame that makes up a goal.

The templates may be further refined to more precisely identify events. In the above example, the user may modify the template of "goal" to require that the ball stop for a second against the net, or that the ball moves near the net and appear against the back drop of the net (even if it does not stop). Of course, such refinement on the part of users in defining an event description may impose more of a burden. Nevertheless, users may elect to revise the templates in order to achieve a greater degree of accuracy. In those environments where the user includes technician that works in a film studio for a professional sports league, the size of the video library may be extremely large, and the user may not have the time to sort through incorrectly identified events. Revising the event definition to reduce the rates of the false positives (incorrectly identified events) may result in dramatic time savings for the technician.

Figure 4:
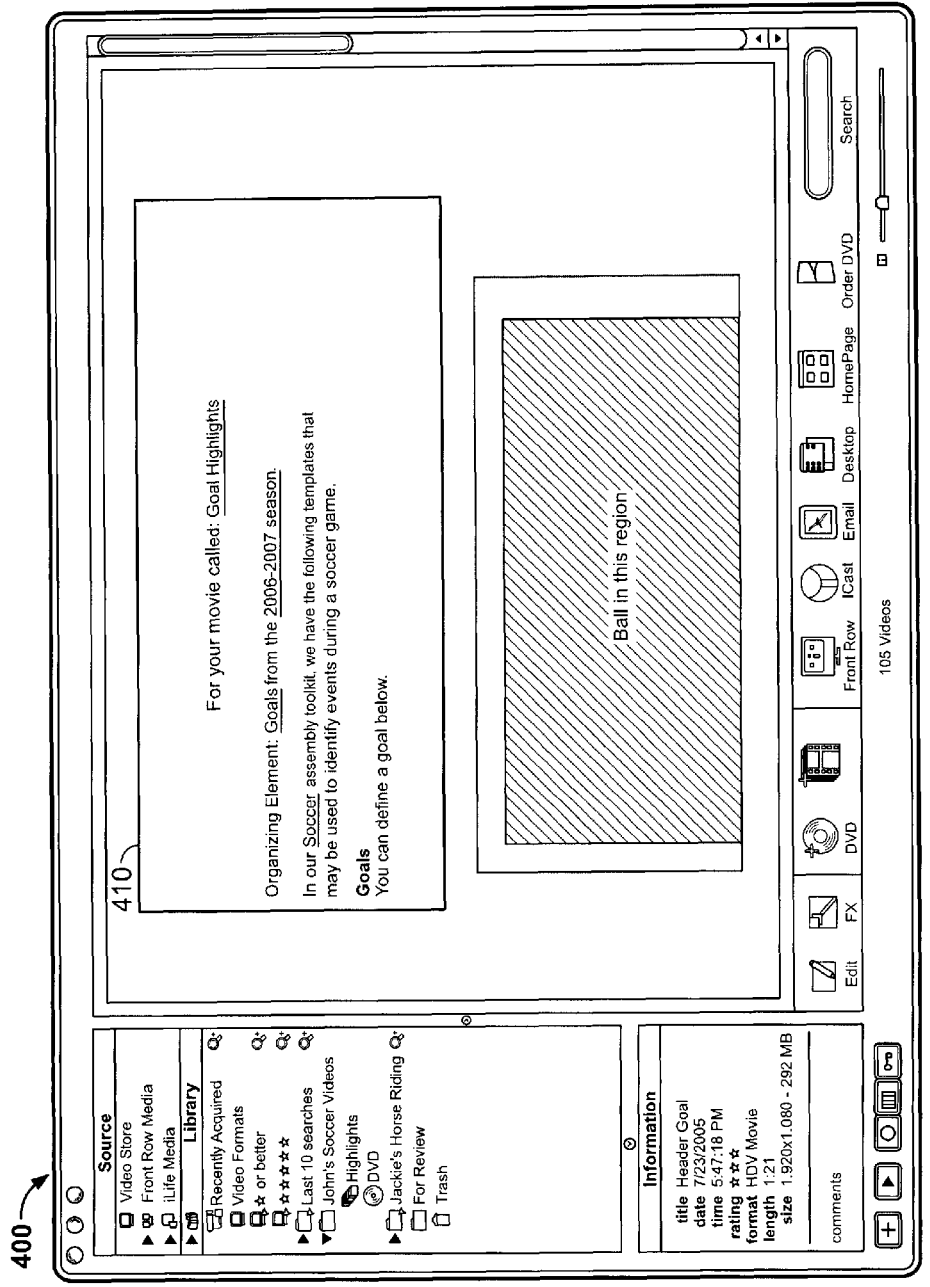
FIG. 4 is a GUI enabling a user create an event description describing an activity for video segments which the user is interested in adding to the list of selected movies.

The video assembly application may not include a template for a desired event and the user may want to generate an event description (template) to identify the desired event. FIG. 4 is a GUI 400 enabling a user create an event description describing an activity for which the user is interested in adding to the list of selected movies. GUI 400 illustrates how a event description may be generated, either because a template does not exist, or because the user elects to not use the existing template. Prompt 410 instructs the user define a goal using the graphical objects shown below. As shown, the user has defined a goal as occurring when the ball lies inside the goal post.

The user may generate event description in a variety of manners. In one implementation, the user first identifies a general class of activity (e.g., a particular sport). In response to selecting a particular sport, the user then may be presented with a menu with images of the objects likely to appear in the general class of activity. The user then may drag and drop the images into the workspace and spatially arrange the objects to identify the desired relationship. In an advanced implementation, the spatial arrangement between objects may be defined with respect to time. The spatial arrangement may be defined to indicate the direction of an object (e.g., the movement of a soccer ball from left to right), the movement of an object relative to an other object (e.g., the movement of a soccer ball relative to the goal post), the path of an object (e.g., the elliptical arc of a soccer ball moving through the air), or the location of the object relative to the horizon (e.g., a ball is being dribbled if it appears below the horizon for a soccer ball being dribbled).

In another implementation, the user constructs a geometrical representation or model of the object using a drawing tool. For example, a goal may be constructed as a reverse, rectangular horseshoe, and the net may be constructed as a mesh of lines. Similarly, a ball may be constructed as a circle or sphere.

Still, other implementations may enable an event description to include the use of actors (e.g., people) as objects. For example, soccer players wearing particular jerseys (e.g., black and white stripes) may be defined as an object that defines a team. The video assembly application may include a template for a player, and then include an imagery cropping control enabling the user to access an image of a player wearing the designated uniform. The user then may crop a portion of the image that makes up the players jersey. The cropped image of the jersey then may be dropped onto the template for the object representing players on a particular team.

Figure 5:
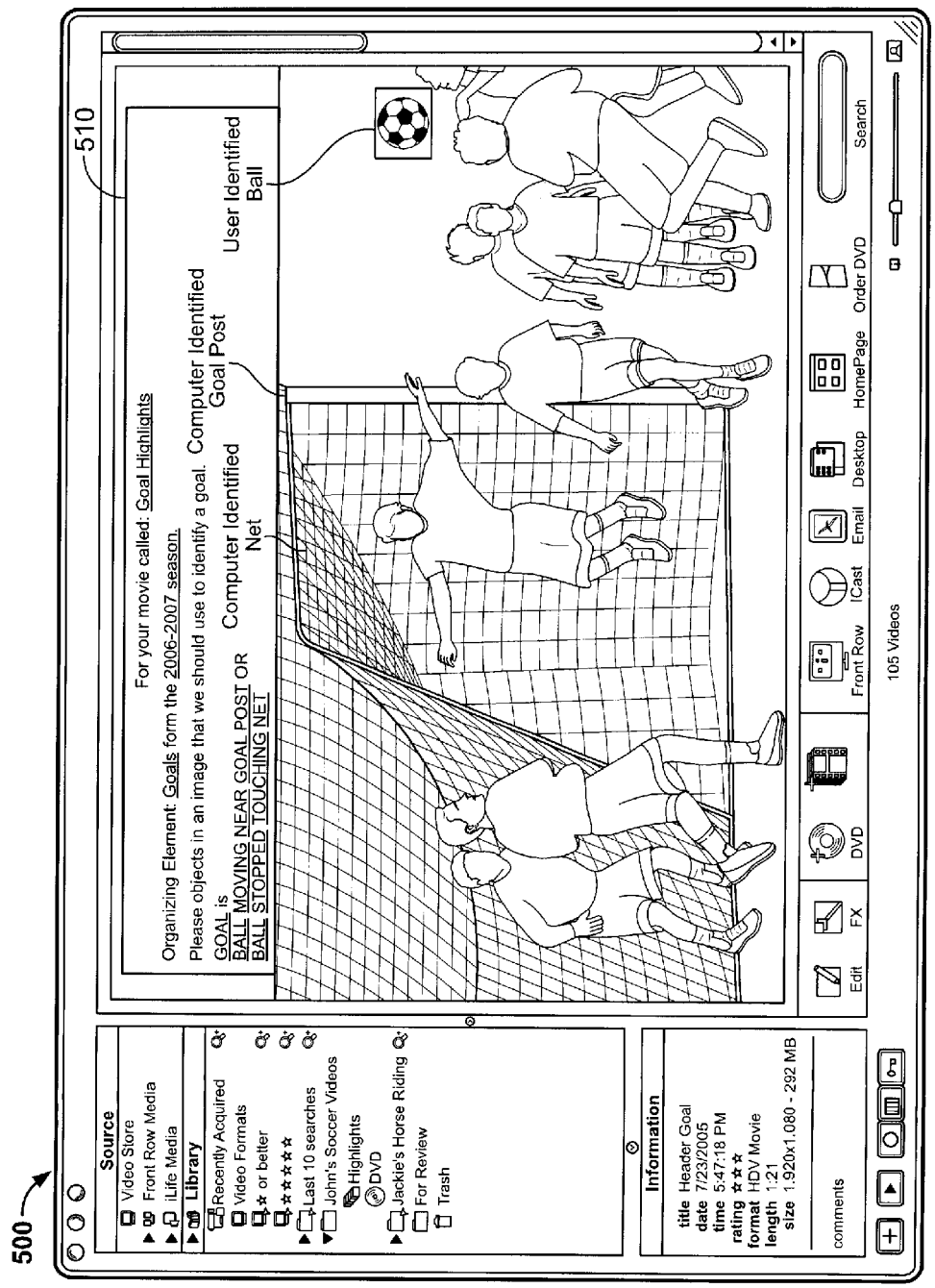
FIG. 5 is a GUI enabling a user to designate visual elements within a launched video segment to identify activities in video segments that will be used in a movie being assembled.

The video assembly application also may be configured to identify objects by enabling a user to identify images of objects within an actual video segment. FIG. 5 is a GUI 500 enabling a user to designate visual elements within a launched video segment to identify activities in video segments that will be used in a movie being assembled. More precisely, GUI 500 includes objects that have been identified by the video assembly application (a computer-identified goal post and a computer-identified net) and also includes a user-identified object (the ball). In one configuration, the user instructs the video assembly application to launch a video segment from the library of video segments. As the launched video segment is played, the user may designate spatial regions within an image using drawing tools to identify objects of interest. In addition, the video assembly application may identify other objects that have been identified. The user then may generate an event description by defining the relationship between objects. As shown in prompt 510, a goal is defined as a "BALL MOVING NEAR GOAL POST OR BALL STOPPED TOUCHING NET." The terms are underlined because the user may interact with an underlined term to modify use of the term in the event description. Thus, the user may select the term TOUCHING to launch a drop down menu with other terms that may be used instead. For example, instead of TOUCHING, the user may select from options that include CLOSE TO or AFTER MOVING TOWARDS, or that permit the user to specify a period of time (e.g., touches for 1 second).

Figure 6:
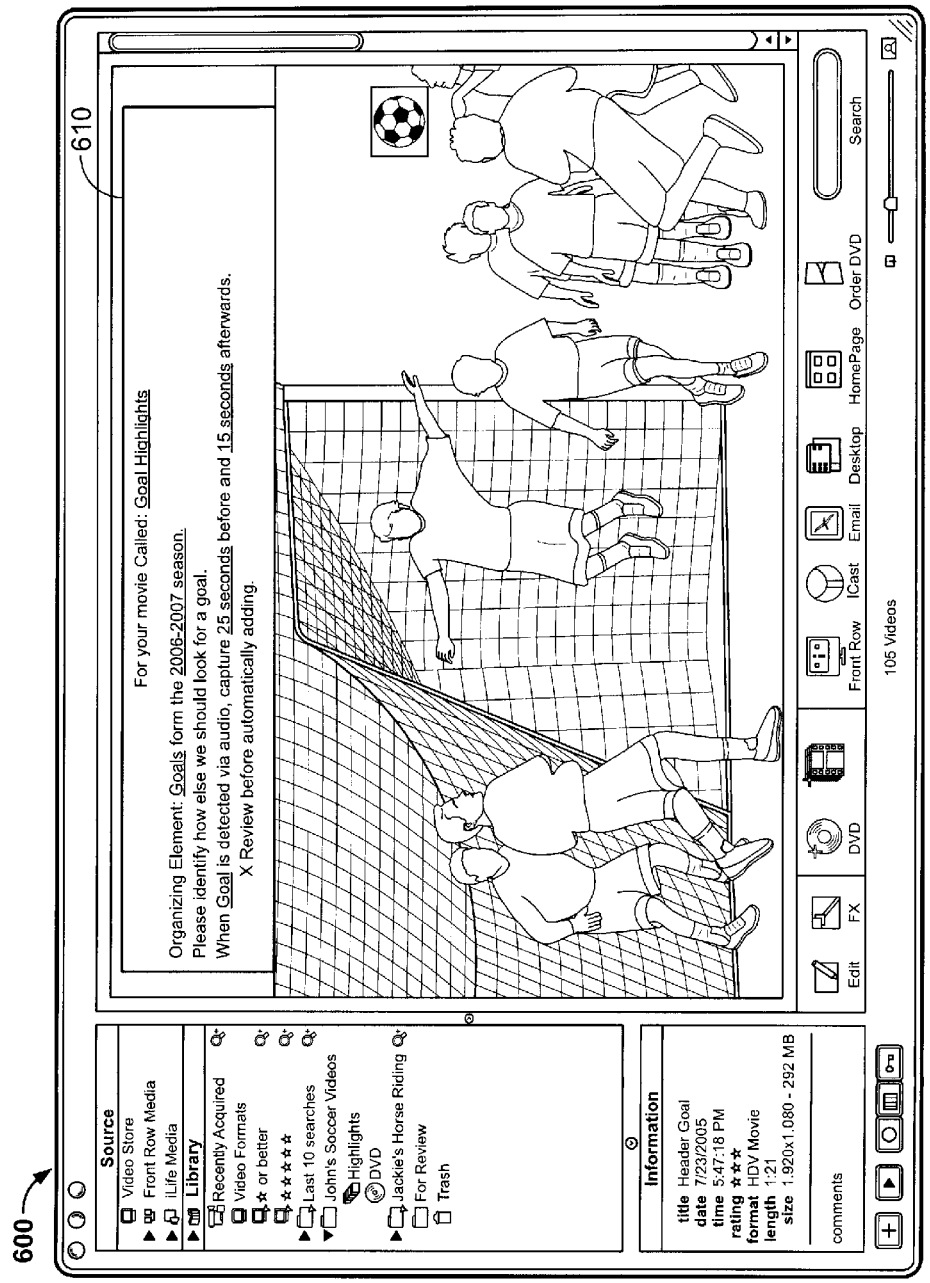
FIG. 6 is a GUI enabling a user to designate audio elements within a video segment to identify activities in the video segments that will be used in a movie being assembled.

Still and moving images need not be the only basis by which activity is identified. Other criteria, such as audio content, may be used to identify an activity. FIG. 6 is a GUI 600 enabling a user to designate audio elements within a video segment to identify activities in the video segments that will be used in a movie being assembled. Oftentimes, activity can be identified by common audio exclamations that accompany a particular action. In the case of soccer, a fan can often be heard screaming "GOAL!!!" after a goal is scored. Thus, a user may configure the video assembly application to detect exclamation of particular words as one means of identifying the activity. As shown in GUI 600, prompt 610 indicates that, when the video assembly application detects that the term "goals" has been detected via audio, a video segment that includes 25 seconds of content before the exclamation and 15 seconds after the exclamation should be added to the list of selected segments. Prompt 610 also indicates that the user will review any identified results before the video segment is added to a movie. Thus, a coach assembling video highlights may wish to avoid those video segments where the other teams fans are exclaiming "Goal!!!"

Figure 7:
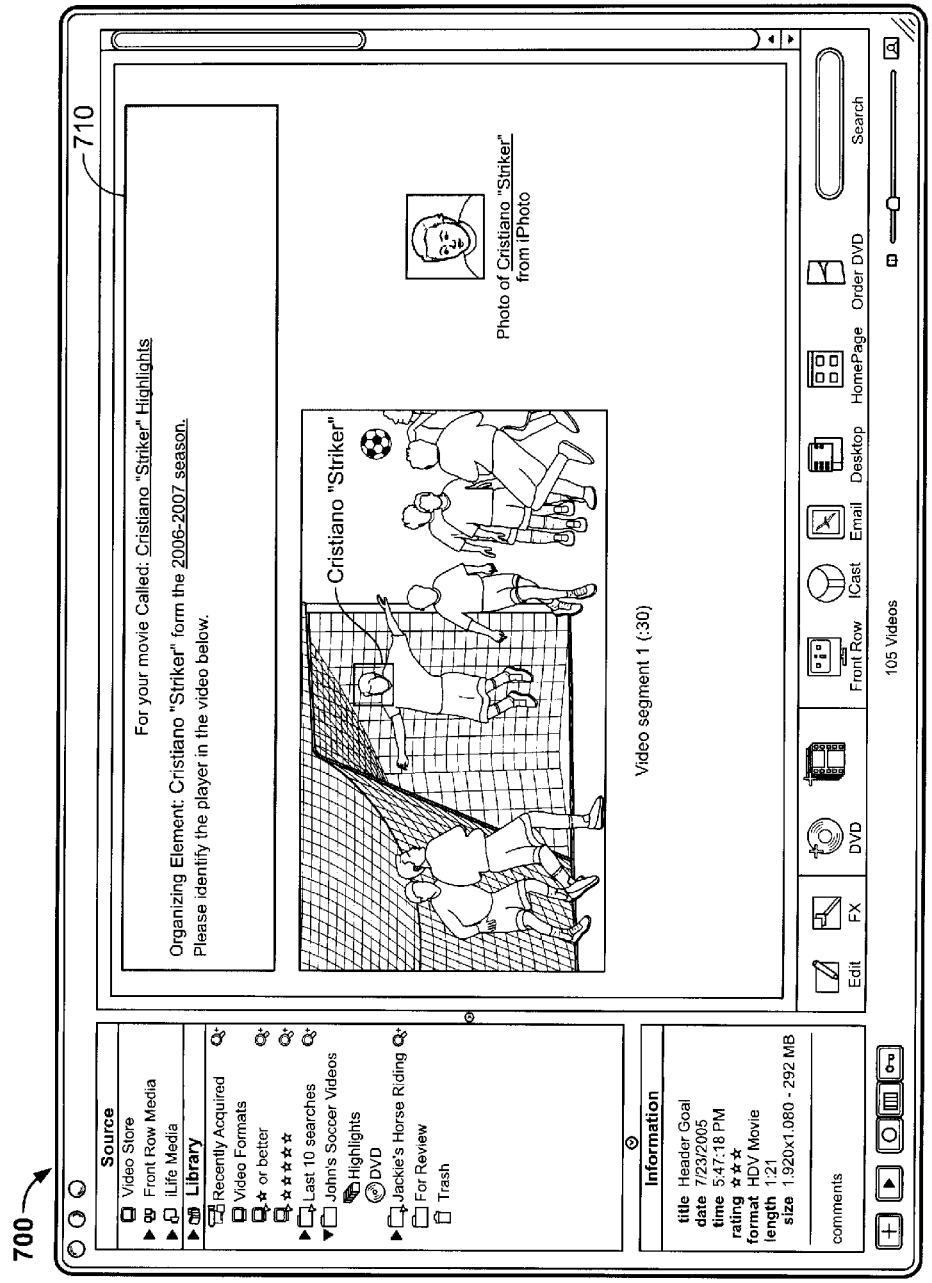
FIG. 7 is a GUI enabling a user to identify instances of the individual appearing in video segments that will be used in a movie being assembled.

In addition to identifying particular events, a user also may want to identify video segments that relate to particular individuals. FIG. 7 is a GUI 700 enabling a user to identify an individual in order to identify instances of the individual appearing in video segments that will be used in the movie being assembled. More precisely, a user may generate a person description describing an individual appearing in video segments which the user is interested in adding to the list of selected movies. The person description then may be used as the organizing element. As shown in GUI 700, prompt 710 indicates that the user is attempting to edit video content related to a player referred to as "Cristiano 'Striker'." The person description for "Cristiano 'Striker'" includes two sources of reference material. The first source includes a graphical designation of the person appearing in a launched video segment. In order to generate a person description for the desired person, the user may be prompted to identify an example of the individual. The user then navigates, in the library of video segments, to launch one of the video segments. The user then designates visual elements, within the launched video segments, that indicate that the individual is appearing so that the video assembly application may use the visual elements to identify that the individual is appearing in other video segments in the library of video segments.

In the second source of information for the person description, the user may retrieve a photograph of the individual from a photo library. Prompt 210 indicates that the image of "Cristiano 'Striker'" has been retrieved from a library in iPhoto™.

Figure 8:
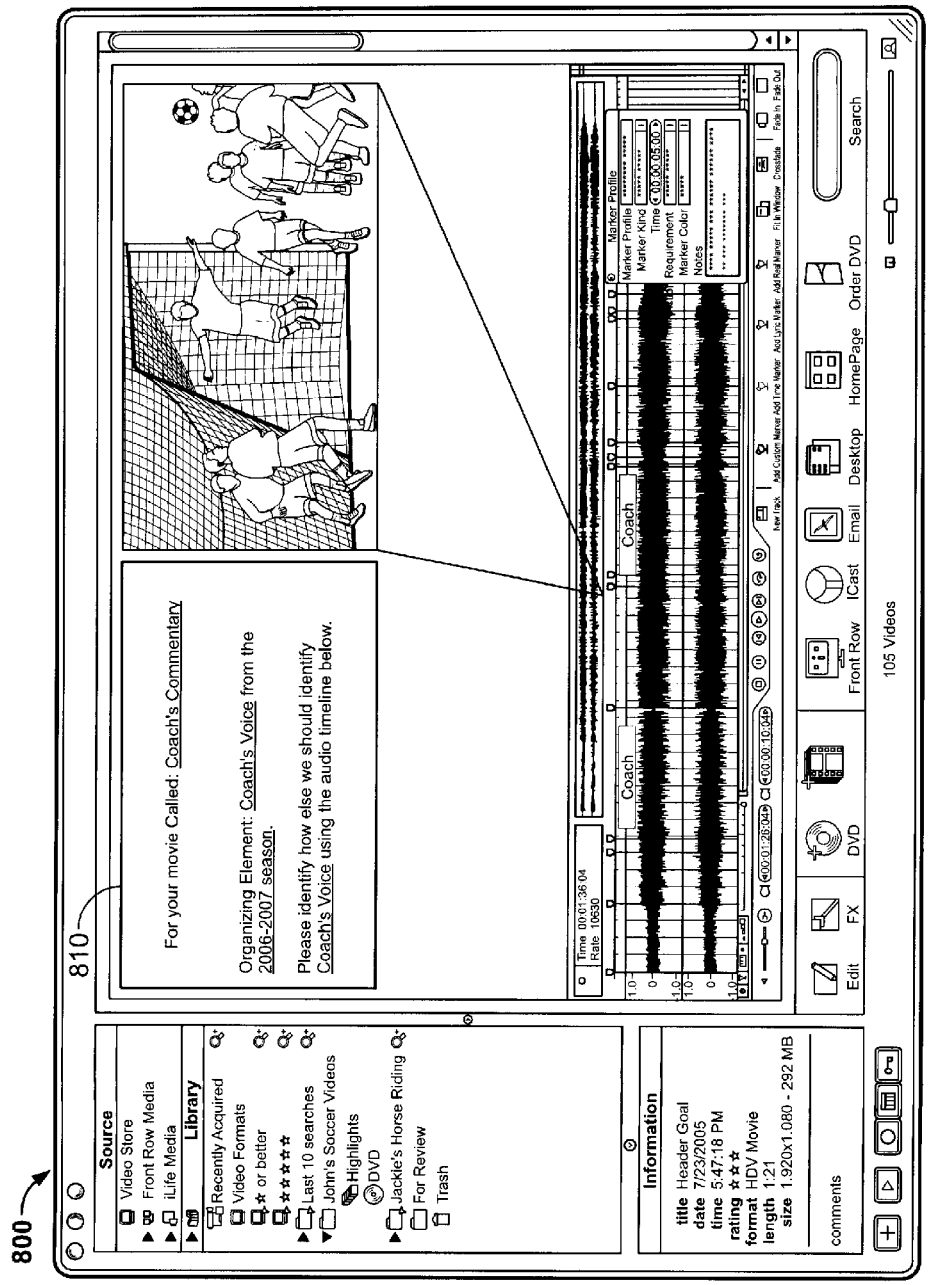
FIG. 8 is a GUI enabling a user to identify an individual's audio profile in order to identify instances of the individual speaking in video segments that will be used in a movie being assembled.

In addition to using exclamations of particular words and images of particular individuals, a user also may use examples of a particular user speaking as the organizing element. FIG. 8 is a GUI 800 enabling a user to identify an individual's audio profile in order to identify instances of the individual speaking in video segments that will be used in the movie being assembled. A video assembly application may be configured to enable a user to enter an individual audio profile describing an individual for whom the user is interested in adding to the list of selected movies so that the video assembly application may use the individual audio profile as the organizing element.

GUI 800 includes a launched video segment and an audio timeline associated with the launched video segment. Prompt 810 then asks the user to designate, using the slider bars marked "Coach", those time periods when the coach is speaking. Once an audio profile has been generated for "Coach," the video assembly application use the audio profile to identify other instances of content when the individual is speaking in other video segments in the library of video segments. The other instances of content then may be added to the list of selected results. In one implementation, the video segments added to the list of selected segments are modified to include the advanced and trailing padding shown in FIG. 6 (e.g., the video assembly applications adds 25 seconds before "Coach" speaks and 15 seconds after coach speaks).

Figure 9:
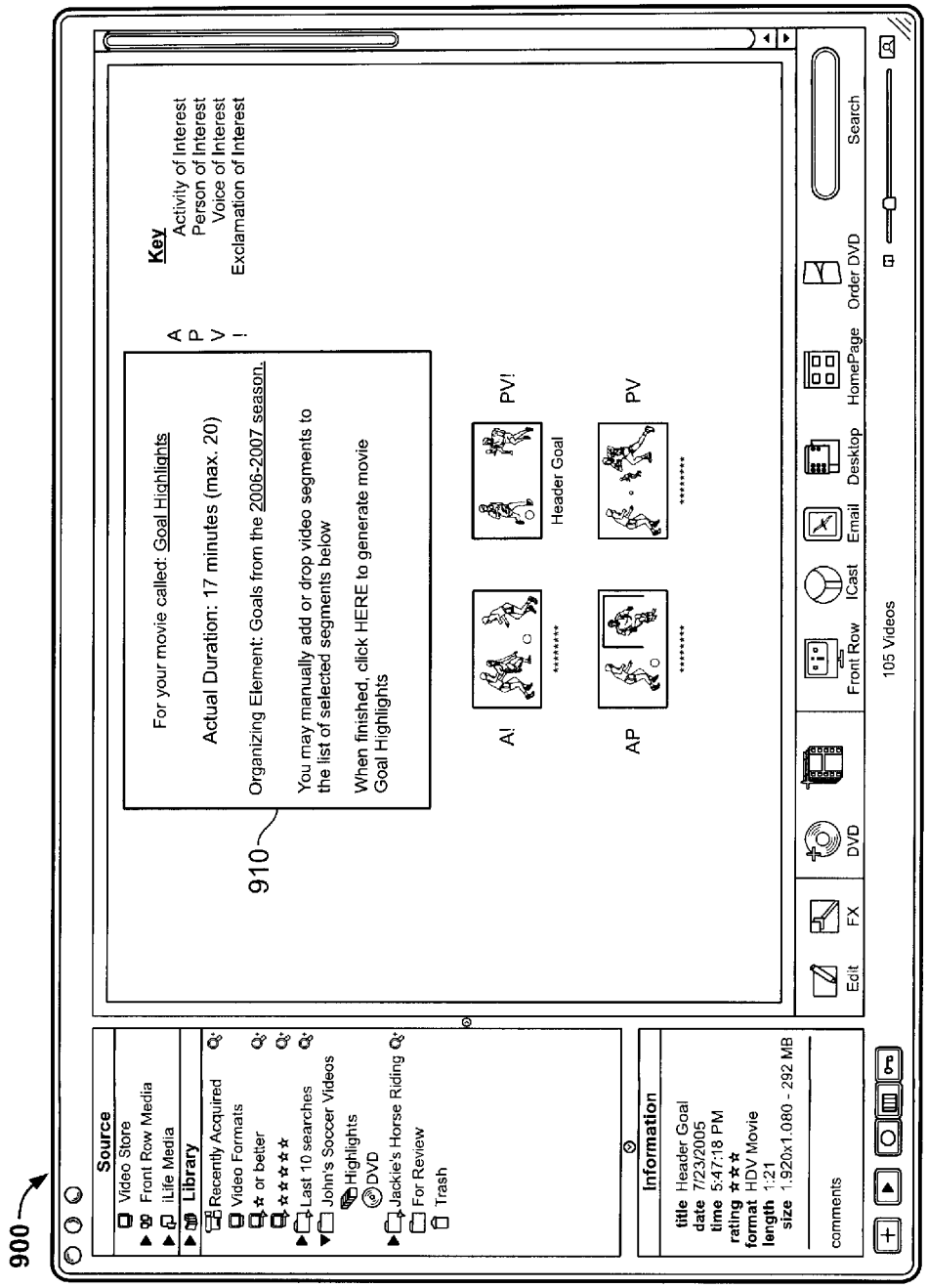
FIG. 9 is a GUI enabling a user to perceive an indication of how a video segment used in a movie being assembled is responsive to a user's interest.

Although FIGS. 1-8 illustrate one type of organizing element being used, different types of organizing elements may in concert with one another. Specifically, the video assembly application may be configured to enable the user to designate two different types of organizing elements selected from the group that includes event descriptions, visual elements, exclamatory descriptions, and individual audio profiles. The video assembly application then may present the list of selected segments before assembling the movie. That is, for each of the selected segments in the list of video segments, an indication of which of the different types of organizing element is related to the video segment is presented. FIG. 9 is a GUI 900 enabling a user to perceive an indication of how a video segment used in a movie being assembled is responsive to a user's interest. More precisely, GUI 900 illustrates how the video assembly application presents an indication of which of the different types of organizing element is related to the video segment.

GUI 900 indicates that four video segments are responsive to organizing elements provided by the user. As indicated by the key, the first video segment features activities of interest (e.g., the imagery of a goal) and an exclamation of interest (e.g., "GOAL!!!"). The video segment to the right of the first segment includes a person of interest, a voice of interest, and an exclamation of interest. The video segment shown below the first segment includes the activity of interest and the person of interest. The last video segment includes the person of interest and the voice of interest. Prompt 910 indicates that the four segments together occupy 17 minutes. The user then may add and drop movies from the list of selected segments.

Figure 10:
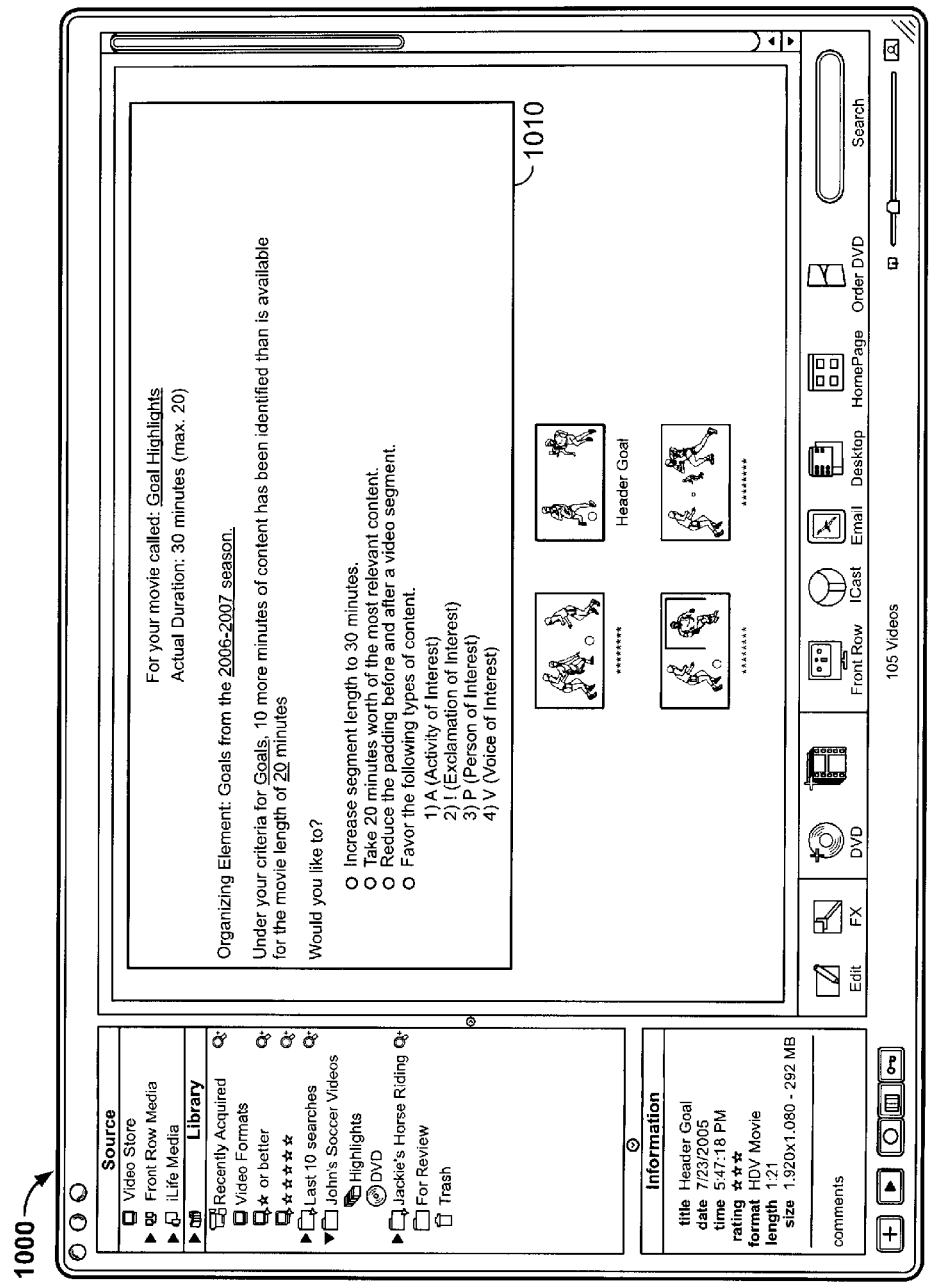
FIG. 10 is a GUI enabling a user to specify criteria by which video segments are selected for inclusion in a movie in the event that the list of selected segments includes more than a threshold amount of content.

Although the four movies show in GUI 900 consume less than the threshold period of time, other configurations may lead to results that return more than a threshold amount of content. The video assembly application may be configured to permit the user to prioritize results or further revise the list of selected results in order to include the content deemed most relevant by the user. FIG. 10 is a GUI 1000 enabling a user to specify criteria by which video segments are selected for inclusion in a movie in the event that the list of selected segments includes more than a threshold amount of content. In particular, prompt 1010 indicates that the time consumed by the list of selected segments exceeds the allocated time of 20 minutes by an additional 10 minutes. In order to address this "surplus" of content, the user is presented with several options. First, the user may increase the movie length to 30 minutes. Alternatively, the user may use the 20 minutes of "most relevant" content as identified by the video assembly application. In identifying the "most relevant" content, the video assembly application may favor the type of organizing element (e.g., favor scene activity over audio exclamations) or duration in which a designated person appears. For example, the video assembly application may favor a video segment where a desired person appears in 70% of the footage over a video a segment where the desired person appears in 40% of the footage.

The user also may reduce the padding around video footage that is used. In yet another option, the user may favor certain types of organizing elements over other types of organizing elements. As shown, video scenes that relates to activities of interest are favored over all other types of organizing elements, followed by exclamations of interest, persons of interest, and then voices of interest. The user may use a "bubble" form to rearrange to priorities of organizing elements.

Figure 11:
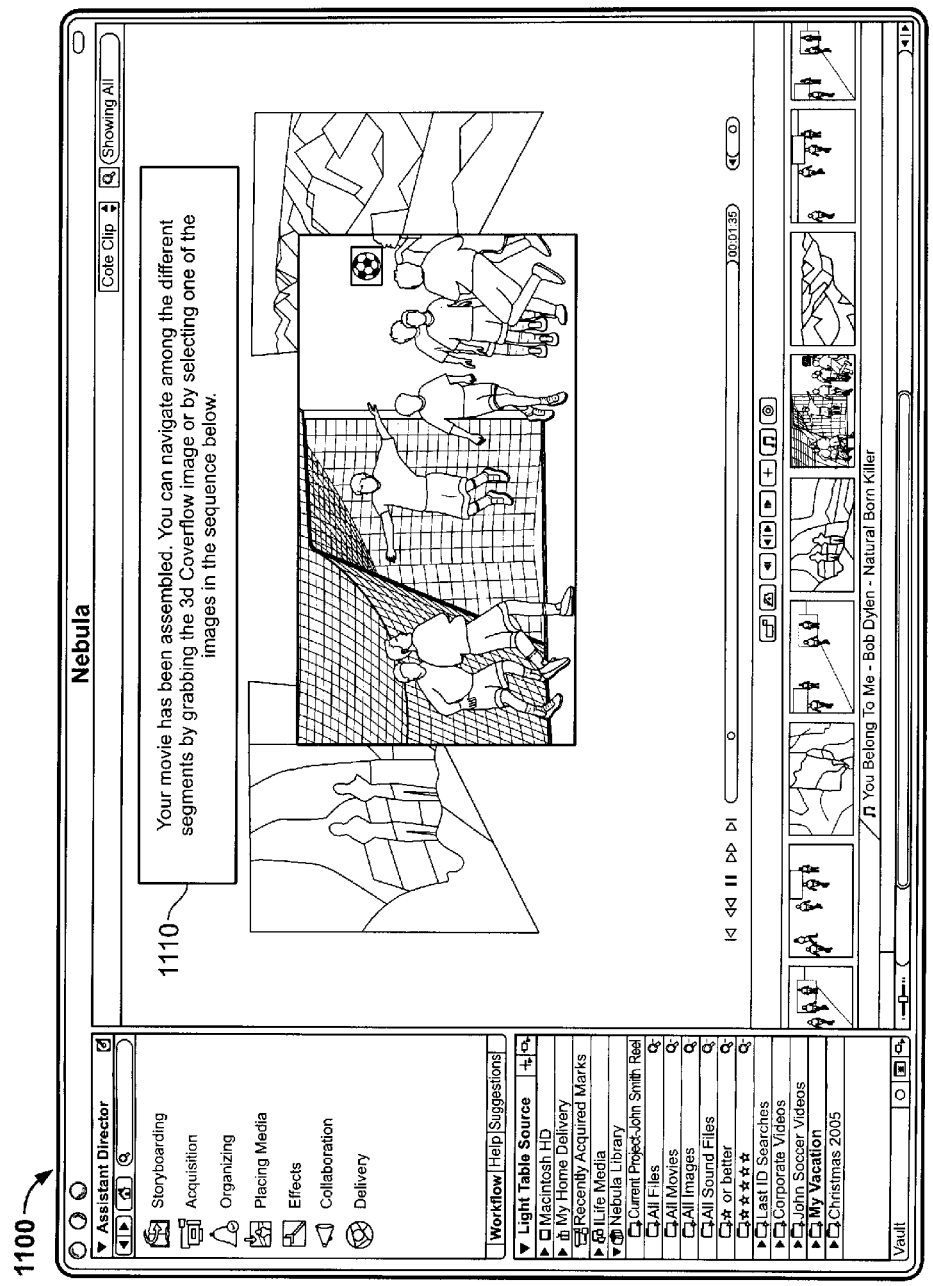
FIG. 11 is a GUI enabling a user to perceive the constituent video segments in an assembled movie.

Once a movie has been assembled, the video assembly application presents the structure of the assembled movie to the user. FIG. 11 is a GUI 1100 enabling a user to perceive the constituent video segments in an assembled movie. As shown, prompt 1110 indicates that a user may grab one or more images from the "3d coverflow" sequence shown above in order to launch the selected segment. Static images with scenes from the different video segments are shown below.

Figure 12:
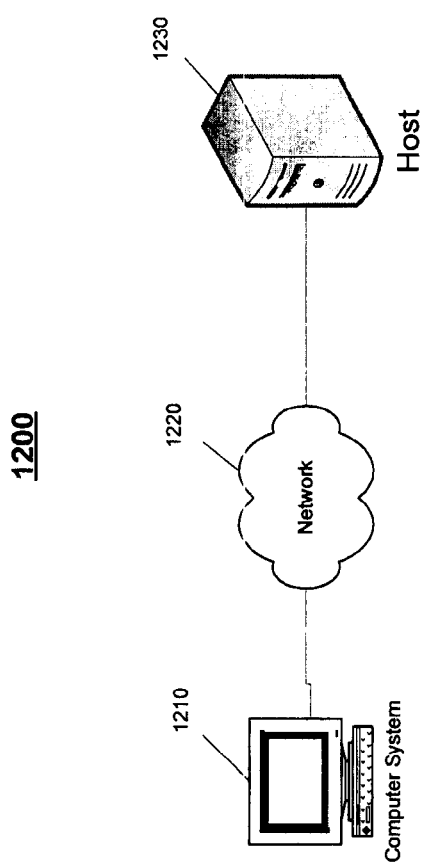
FIG. 12 is a block diagram of a system that assembles movies.

FIG. 12 is a block diagram of a system 1200 that assembles movies. The system 1200 includes a client 1210, a network 1220, and a host 1230. Although the communications system 1200 is shown as a network-based system, the system may access media files residing in a standalone device or in a different configuration. For example, the system 1200 may include an iMac™ running MacOS X 10.4 that operates a video assembly application.

Each of the client 1210 and the host 1230 may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. The client 1210 may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, or storage medium, that is capable of being delivered to the client 1210 or the host 1230.

The client 1210 may include one or more devices capable of accessing content on the host 1230. The host client 1210 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, the client 1210 includes one or more information retrieval software applications (e.g., a browser, a mail application, an instant messaging client, an Internet service provider client, a media player, or an other integrated client (e.g., AppleTV™)) capable of exchanging communications. The information retrieval applications may run on a general-purpose operating system and a hardware platform that includes a general-purpose processor and specialized hardware for graphics, communications and/or other capabilities. In another implementation, the client 1210 may include a wireless telephone running a micro-browser application on a reduced operating system with general purpose and specialized hardware capable of operating in mobile environments.

The client 1210 may include one or more media applications. For example, the client 1210 may include a software application that enables the client 1210 to receive and display audio or video content. The media applications may include controls that enable a user to configure the user's media. For example, the client 1210 may include a non-linear editor with a video assembly application.

The network 1220 may include hardware and/or software capable of enabling direct or indirect communications between the client 1210 and the host 1230. As such, the network 1220 may include a direct link between the client and the host, or it may include one or more networks or subnetworks between them (not shown). Each network or subnetwork may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

Generally, the host 1230 includes one or more devices configured to store digital content. For instance, a host 1230 typically includes a collection or library of content for distribution. Alternatively, or in addition, the host 1230 may convert a media source (e.g., a video or audio feed) into a first feed of data units for transmission across the network 1220. The host 1230 also may include an input/output (I/O) device (e.g., video and audio input and conversion capability), and peripheral equipment such as a communications card or device (e.g., a modem or a network adapter) for exchanging data with the network 1220.

The host 1230 may include a general-purpose computer having a central processor unit (CPU), and memory/storage devices that store data and various programs such as an operating system and one or more application programs. Other examples of a content source 110 include a workstation, a server, a special purpose device or component, a broadcast system, other equipment, or some combination thereof capable of responding to and executing instructions in a defined manner.

The host 1230 may include video editing software configured to edit and assemble video content. In one implementation, the host 1230 is used as a source for additional event-description templates that are not available on a client 1210. For example, third party software developers may develop very detailed and accurate templates for very particular environments. Thus, a football coach may purchase specialized templates offered by a software provider that are not available on the coach's video assembly application on the client 1210. In other implementation, the host 1230 is used as a source of content that is not available on the user's client 1210.

Figure 13:
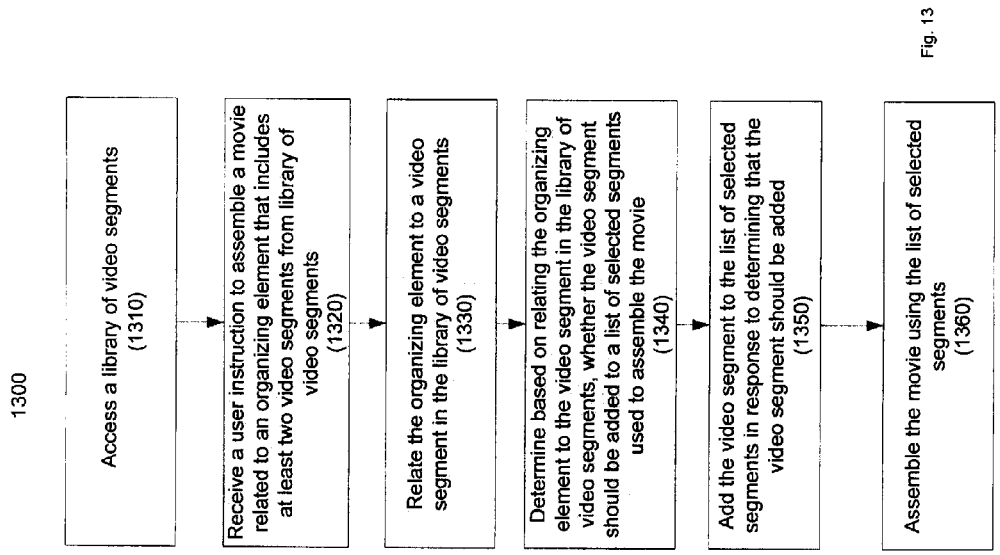
FIGS. 13 and 14 are flow charts of a process by which movies are assembled.

FIG. 13 is flow chart 1300 of a process by which movies are assembled. The system performing the operations described below is generally described as a video assembly application running on a processor. Nevertheless, the operations may be performed on other systems and applications, such as a specialized web browser that interfaces with a host to assemble video content.

Initially, the video assembly application accesses a library of video segments (1310). For example, a video assembly application may present a list of video segments that have been downloaded from the user's camcorder and video camera in the user's wireless phone. In another implementation, accessing the library of video segments includes accessing a library of video segment that resides on a host (e.g., an Internet server).

The video assembly application then receives a user instruction to assemble a movie related to an organizing element that includes a video segment from library of video segments (1320). For example, a soccer coach may configure the video assembly application to retrieve excerpts with all of the season's goals. And, although FIGS. 1-8 previously illustrated particular types of organizing elements, such as occurrence of particular activities, people, terms and voices being used, other organizing elements may be used. A source device, such as a digital camcorder, may be configured to generate metadata tags as video content is being captured. The metadata tags may include camera focal length, location information derived via a GPS (Global Positioning System), lighting conditions, and time and temperature information. One or more aspects of the metadata tags may be used as directly or indirectly as organizing elements.

In one implementation, receiving the user instruction to assemble a movie includes prompting the user to identify instances of a desired activity or individual. For example, where the organizing element is directed to identifying footage related to a particular individual, the user may be asked to launch a video segment in which the individual appears and graphically designate the user's face in a scene in which the user appears. Information related to the user's face (e.g., distance between eyebrows, and the angle and location of different facial features) then may be used to identify other video content in which the user appears.

The video assembly application relates the organizing element to a video segment in the library of video segments (1330). For example, where the organizing element includes "Goals" and is defined as an object "ball" moving near the goalpost rectangular structure, or as a "ball" object stopped touching a net, the video assembly application accesses the library of video segments and determines if a particular video segment being analyzed features the desired activity.

The video assembly application may use different intervals of time in which analyze whether a particular scene in a video segment is responsive to the organizing element. In one implementation, video content is analyzed on a periodic basis (e.g., every two seconds). The period may be adjusted based on the degree of change present in a particular window. If the video assembly application detects that the background colors change, indicating that a different portion of a soccer game is being filmed, and thus, potentially representing a counter attack resulting in a goal, the period of time may be reduced. Likewise, if the footage represents a school play with the same two actors continually speaking, the period of time may be increased until the video assembly application detects that another actor has begun speaking. Alternatively, the user may specify the period of time or the period of time may be based on the user providing a description of the underlying activity (e.g., a soccer game).

Based on relating the organizing element to the video segment in the library of video segments, the video assembly application determines whether the video segment should be added to a list of selected segments used to assemble the movie (1340). For example, the video assembly application may determine that a goal has been scored at a particular moment in time.

The video assembly application then adds the video segment to the list of selected segments in response to determining that the video segment should be added (1350). Where the video segment includes a goal, the video assembly application may create an excerpt that includes the time period 20 seconds before the goal and ten seconds after the goal. If a particular video segment includes multiple instances of the same activity, each of the instances may be added as a separate excerpt in the list of video segments. Alternatively, the video segment with the multiple instances may be added with a label indicating which portions of the video segment feature content responsive to the organizing element. The list of segments that will be used in the movie is presented to the user (not shown).

The video assembly application then assembles the movie using the list of selected segments (1360). For example, the video assembly application may generate a movie that will be used in a DVD. Each of the video segments in the movie may be associated with different chapter markers that enable a user viewing the movie to fast forward through the different segments.

Figure 14:
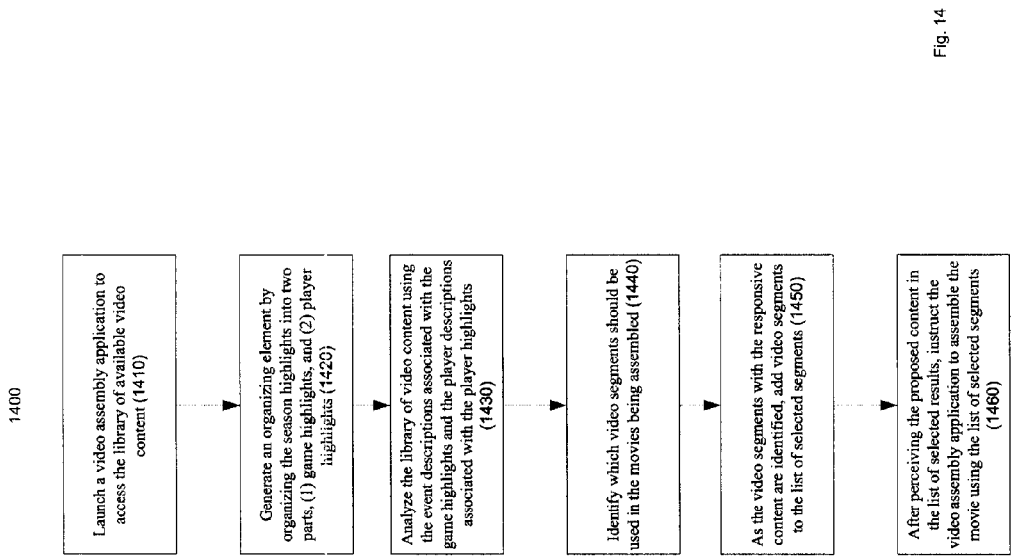

FIG. 14 is flow chart 1400 of a process by which a soccer coach assembles a movie with the season's highlights. First, the coach launches a video assembly application to access the library of available video content (1410). Relying on a digital camcorder to capture the entire season in video, the coach has downloaded the video segments and loaded them to a library that is analyzed by the video assembly application. The library may include online content that has been posted to a team directory where parents can load their content.

The coach generates an organizing element by organizing the season highlights into two parts, (1) game highlights, and (2) player highlights (1420). First, the coach configures instructions to generate game highlights. For game highlights, the coach uses a configuration made up of "Goals" and "Saves." The coach pulls up a soccer template and uses an existing template for "Goals." The coach then generates an event description for "Saves" by creating a rule that includes "shots" (BALL moving towards GOAL) AND also includes images of the team's Goalie. After brief review of the list of selected segments for "Saves" using a test segment, the coach realizes that too many goals from the adversary appear. As a result, the coach modifies the organizing element so that "Saves" also includes the Boolean modifier AND NOT GOAL. A brief review confirms the efficacy of the proposed rule, and the coach proceeds with building the movie.

The coach then builds the second part, player highlights, by generating an organizing element that features a person description for each player. The coach allocates two minutes for each of his 13 players, and indicates that the most "relevant" content should be used in identifying which two minutes of content should be used.

The video assembly application then analyzes the library of video content using the event descriptions associated with the game highlights and the player descriptions associated with the player highlights (1430).

The video assembly application then identifies which video segments should be the movies being assembled (1440). The video assembly application may include movie for "game highlights" and a movie for "player highlights." As the content is being analyzed and added to the list of selected results, the two different movies may be presented alongside one another in order to give the coach a sense of how much content is responsive to the user's interest. For example, in a sport like soccer, where goals may not be that common, the "game highlights" may lead to an insufficient amount of content being generated. As a result, the user may perceive the anticipated shortfall and revise the event description in order to identify more interest subject matter (perhaps by using "shots" instead of "goals").

As the video segments with the responsive content are identified, video segments are added to the list of selected segments (1450). After perceiving the proposed content in the list of selected results, the coach then instructs the video assembly application to assemble the movie using the list of selected segments (1460). The coach then may burn the movies to a DVD. The DVD may include a menu with each of the two movies, where each of the video segments in a movie is configured as a chapter.

Other implementations are within the scope of the following claims. For example, although many of the operations as identifying a particular type of activity or a particular user, other characteristics may be used to identify particular video content. In one instance, lighting characteristics are used to identify video segments. More precisely, a video assembly application may be configured to enable a user to specify a time of day (e.g., morning, afternoon, evening, night) or environment (e.g., indoor, outdoor, or stadium lighting) that is used to identify relevant video segments.

What is claimed is:

1. A computer-implemented method comprising:
    accessing a library of video segments;
    receiving a user instruction to assemble a movie from video segments from the library of video segments, the user instruction including designating content within a first video segment;
    responsive to receiving the user instruction, identifying an organizing element based on the designated content;
    relating the organizing element to a video segment in the library of video segments;
    automatically determining, based on relating the organizing element to the video segment in the library of video segments, whether the video segment should be added to a list of selected segments used to assemble the movie;
    automatically adding the video segment to the list of selected segments in response to determining that the video segment should be added; and
    assembling the movie using the list of selected segments.

2. The method of claim 1 wherein receiving the user instruction to assemble a movie related to an organizing element includes:
    receiving, from a user, an event description describing an activity which the user is interested in seeing in video segments added to the list of selected segments; and
    using the event description as the organizing element.

3. The method of claim 2 further comprising:
    prompting the user to identify an example of the activity;
    enabling the user to navigate in the library of video segments to launch one of the video segments;
    enabling the user to designate visual elements, within the launched video segments, that indicate that the activity is occurring; and
    using the visual elements to identify whether the activity is occurring in other video segments in the library of video segments.

4. The method of claim 3 wherein enabling the user to designate visual elements includes:
    analyzing spatial imagery within a launched video segment;
    identifying one or more objects in the launched video segment;
    graphically designating the one or more objects in the launched video segment;
    enabling the user to select one or more of the graphically-designated objects; and
    using the graphically-designated objects as the visual elements that identify the activity that is occurring in other video segments in the library of video segments.

5. The method of claim 3 further comprising:
    presenting the user with a list of activities associated with default elements for each of the activities, the default elements related to previously-defined visual elements that are descriptive of the activity;
    enabling the user to select one of the activities; and
    using the default elements for the selected activity to identify that the activity is occurring in other video segments in the library of video segments.

6. The method of claim 5 further comprising:
    launching a video segment from the library of video segments;
    identifying instances of the default elements appearing in the video segment;
    prompting the user to confirm that the identified instances are responsive to interests of the user; and adding content related to the identified instances to the list of selected segments.

7. The method of claim 1 wherein receiving the user instruction to assemble a movie related to an organizing element includes:
receiving, from a user, a person description describing an individual which the user is interested in seeing in video segments added to the list of selected segments; and
using the person description as the organizing element.

8. The method of claim 7 further comprising:
prompting the user to identify an example of the individual;
enabling the user to navigate in the library of video segments to launch one of the video segments;
enabling the user to designate visual elements, within the launched video segments, that indicate that the individual is appearing; and
using the visual elements to identify whether the individual is appearing in other video segments in the library of video segments.

9. The method of claim 1 wherein receiving the user instruction to assemble a movie related to an organizing element includes:
receiving, from a user, an exclamatory description of audio content that the user is interested in being included in video segments added to the list of selected segments; and
using the exclamatory description as the organizing element.

10. The method of claim 1 wherein receiving the user instruction to assemble a movie related to an organizing element includes:
receiving, from a user, an individual audio profile describing an individual whom the user is interested in seeing in video segments added to the list of selected segments; and
using the individual audio profile as the organizing element.

11. The method of claim 10 further comprising:
prompting the user to identify an example of the individual speaking;
enabling the user to navigate in the library of video segments to launch one of the video segments;
enabling the user to indicate audio designators for portions of time, within the launched video segments, that indicate that when the individual is speaking;
using the audio designators to automatically identify other video segments in the library of video segments that include instances of content when the individual is speaking; and
adding the identified other video segments to the list of selected segments.

12. The method of claim 1 further comprising:
presenting the list of selected segments to a user before assembling the movie; and
enabling the user to further specify which of the selected segments from the list of selected segments should be used to assemble the movie.

13. The method of claim 1 further comprising:
enabling the user to designate different types of organizing elements selected from the group that includes event descriptions, visual elements, exclamatory descriptions of audio content, and individual audio profiles;
presenting, before assembling the movie, the list of selected segments;
for each of the selected segments in the list of video segments, presenting an indication of which of the designated different types of organizing element is related to the video segment; and
enabling the user to further specify which of the selected segments from the list of selected segments should be used to assemble the movie.

14. The method of claim 1 wherein adding the video segment to the list of selected segments includes adding an excerpt from a larger portion of video content, the excerpt related to the organizing element.

15. The method of claim 14 wherein adding the excerpt includes:
adding introductory content occurring in the video segment in advance of desired content related to the organizing element; and
adding trailing content occurring in the video segment that follows the desired content, wherein the introductory content and the trailing content are not required to be responsive to the organizing element.

16. The method of claim 14 further comprising not adding those portions of content from the video segment that are not related to the organizing element.

17. The method of claim 1 further comprising:
identifying a first instance of content in a video segment related to the organizing element;
identifying a second instance of content in the video segment related to the organizing element; and
adding the first and second instances of content to the list of selected segments as separate and distinct video segments.

18. A system comprising:
a library of video segments; and
a computer system including a processor that is configured to execute one or more processes to perform operations including:
access the library of video segments;
receive a user instruction to assemble a movie from video segments from the library of video segments, the user instruction including designating content within a first video segment;
responsive to receiving the user instruction, identifying an organizing element based on the designated content;
relate the organizing element to a video segment in the library of video segments;
automatically determine, based on relating the organizing element to the video segment in the library of video segments, whether the video segment should be added to a list of selected segments used to assemble the movie;
automatically add the video segment to the list of selected segments in response to determining that the video segment should be added; and
assemble the movie using the list of selected segments.

* * * * *